Patented Nov. 21, 1922.

1,436,288

UNITED STATES PATENT OFFICE.

HERMANN PLAUSON, OF HAMBURG, GERMANY.

PROCESS FOR THE MANUFACTURE OF ALKYL ETHERS OF VINYL ALCOHOLS AND HOMOLOGUES THEREOF.

No Drawing.  Application filed January 13, 1921.  Serial No. 437,114.

*To all whom it may concern:*

Be it known that I, HERMANN PLAUSON, Esthonian subject, residing in Hamburg, Germany, have invented certain new and useful Improvements in the Processes for the Manufacture of Alkyl Ethers of Vinyl Alcohols and Homologues Thereof (for which I have made application in Germany May 24, 1918), of which the following is a specification.

It is known that concentrated sulphuric acid combines with allylene at 0° C. giving propylene sulphuric acid (Journal f. prakt. Chemie (2), vol. 60, pages 441–442.) It has also been proposed to combine acetylene with sulphuric acid under various conditions and to work up reaction products from alcohols.

Hitherto it was not known that vinyl sulphuric acid could be obtained with a good yield by the action of concentrated sulphuric acid cooled to 0° to —15° C. on acetylene in presence of certain catalysts under increased pressure and that by subsequent treatment of the reaction products in alcohol or by interaction with alcohol already contained in the mixture, it was possible to obtain vinyl ether smoothly.

This process forms the object of the present invention.

The combination of the employment of increase of pressure with the other working conditions hereafter described is of importance because the products obtained by the treatment of acetylene with sulphuric acid depend fundamentally upon the working conditions. For instance at temperatures of plus 10–15° C. only small quantities of vinyl sulphuric acid are formed and at still higher temperatures viz. 60–100° C., in presence of mercury salts, it is found that no vinyl compounds are obtained but the ethylidene ethers of the alcohols in question.

Example 1.

96 parts by weight of cold anhydrous sulphuric acid are gradually saturated with 26–28 parts by weight of acetylene at a pressure of 2–5 atmospheres and at a temperature of 0 to —15° C. Vinyl sulphuric acid is formed almost quantitatively according to the following formula;

$$CH \equiv CH + H_2SO_4 = CH_2 = CH - SO_3H.$$

Efficient cooling is of the greatest importance for the smooth progress of the reaction since the heat of reaction would otherwise cause decomposition of the vinyl sulphuric acid. The reaction occurs still more smoothly if an accelerator such as mercuric sulphate in small amounts, e. g. 1 to 2 parts by weight, is added to the sulphuric acid.

If this vinyl sulphuric acid is now allowed to react with an alcohol, e. g. 50 parts by weight of ethyl alcohol by warming, preferably under reduced pressure, then about 40–50 parts by weight (55–70% of theory) of approximately pure vinyl ethyl ether of boiling point 35° C. distills over according to the following reaction;

$$CH_2 = CH - SO_3OH + CH_3 - CH_2OH = CH_2 = CH - O - CH_2 - CH_3 + H_2SO_4.$$

If all the necessary precautions are observed, especially as regards efficient cooling it is possible to use the same sulphuric acid several times.

Vinyl isopropyl or vinyl normal propyl ether can be obtained in a yield of 70–80% by using 65 parts by weight of isopropyl or normal propyl alcohol instead of ethyl alcohol.

Example 2.

1 molecular proportion of concentrated, practically anhydrous, sulphuric acid containing mercuric sulphate in the dissolved form is cooled to about —15° C. and cautiously mixed with about 1½ to 2 molecular proportions, i. e. an excess, of ethyl alcohol also cooled to —15° C. 1 molecular proportion of acetylene gas is gradually forced into this mixture at a pressure of 2–5 atmospheres until the gas is completely absorbed. The vinyl ethyl ether is then distilled off preferably under reduced pressure with efficient cooling of the vapour so produced. It is almost pure and boils at 35° C. at 760 mm. presure. Since the sulphuric acid exerts a decomposing action on the vinyl ether, the reaction mixture must be worked up as rapidly as possible.

In the same way the ethers of other alcohols can be prepared. Acetylene can be replaced by its homologues in most examples. The ethers so obtained are very suitable for the manufacture of varnishes, artificial resins and synthetic rubber-like bodies.

Having now particularly described and ascertained the nature of my said invention and in what manner the same is to be performed, I declare that what I claim is:—

1. Process for the manufacture of an alkylene body which consists in treating a hydrocarbon of the acetylene series at increased pressure with sulphuric acid cooled below 0° C.

2. Process for the manufacture of an alkylene sulphuric acid which consists in treating a hydrocarbon of the acetylene series at increased pressure with sulphuric acid cooled below 0° C. in presence of a catalyst.

3. Process for the manufacture of a vinyl derivative which consists in treating acetylene at increased pressure with sulphuric acid cooled below 0° C.

4. Process for the manufacture of vinyl sulphuric acid which consists in treating acetylene at increased pressure with sulphuric acid cooled below 0° C. in the presence of a catalyst.

In witness whereof, I have hereunto signed my name this 30 day of Dec. 1920, in the presence of two subscribing witnesses.

HERMANN PLAUSON.

Witnesses:
HECTOR ARMSTRONG,
W. H. BEESTON.